UNITED STATES PATENT OFFICE.

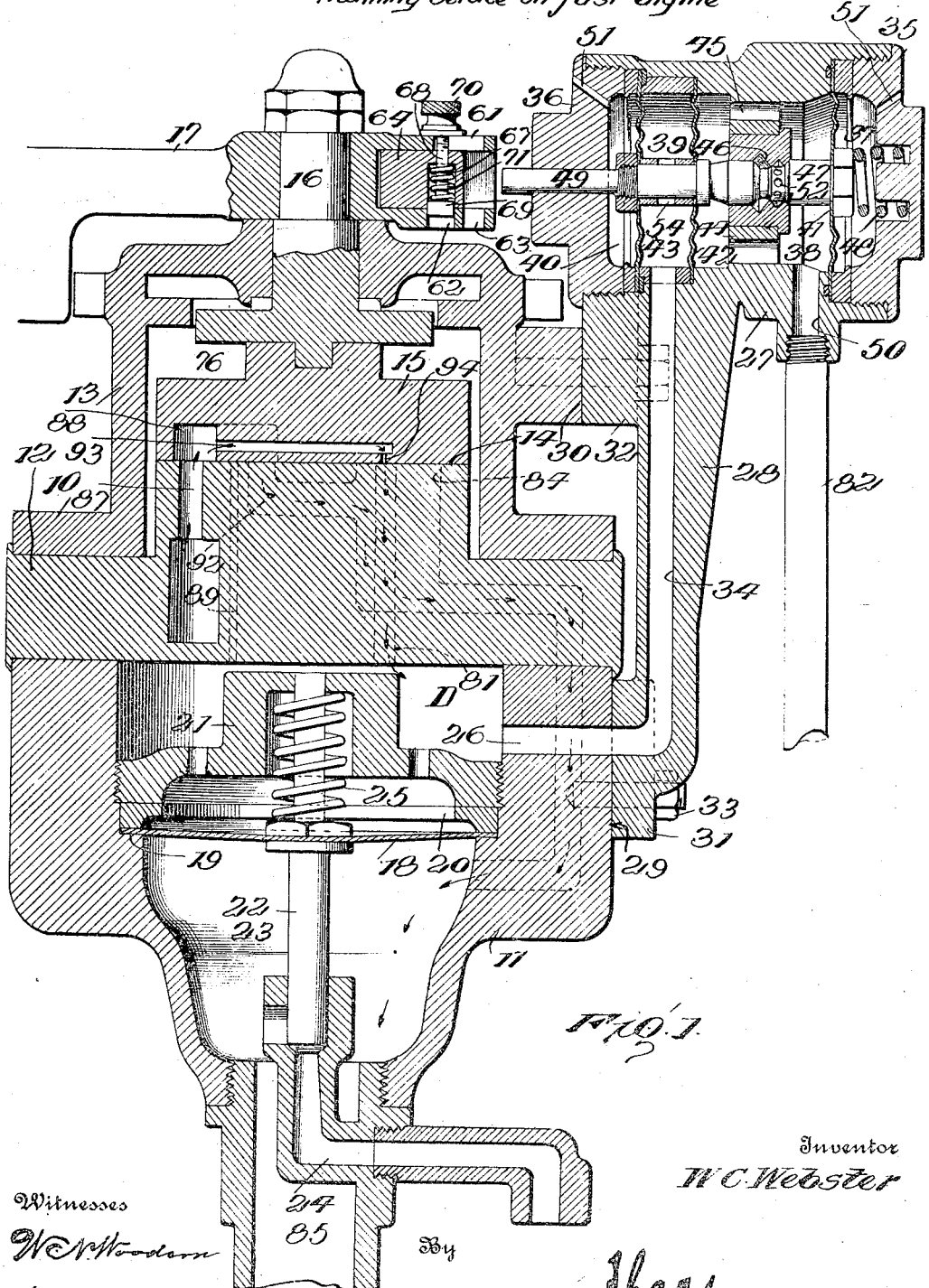

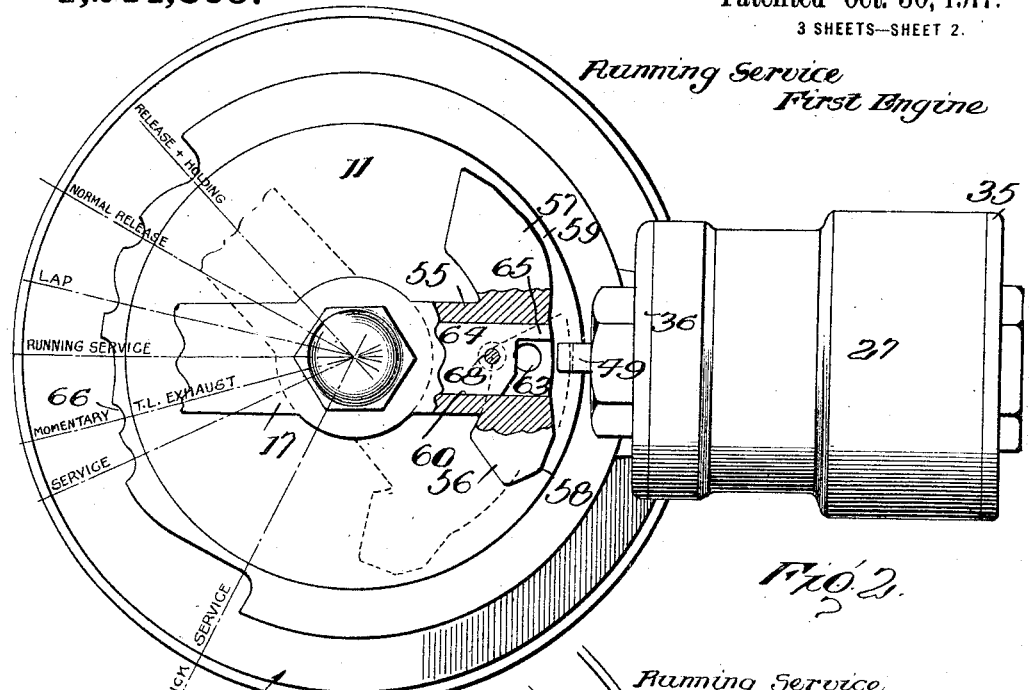
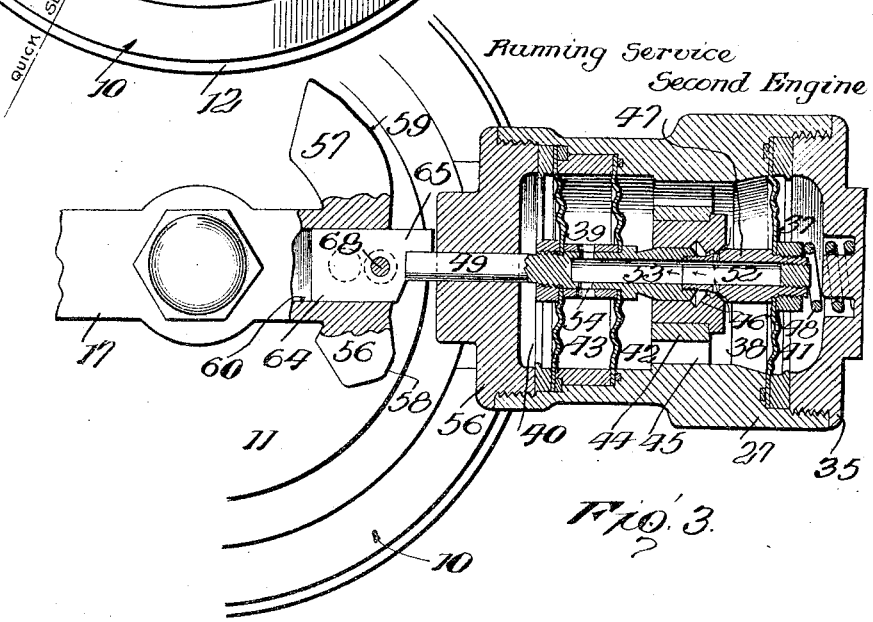

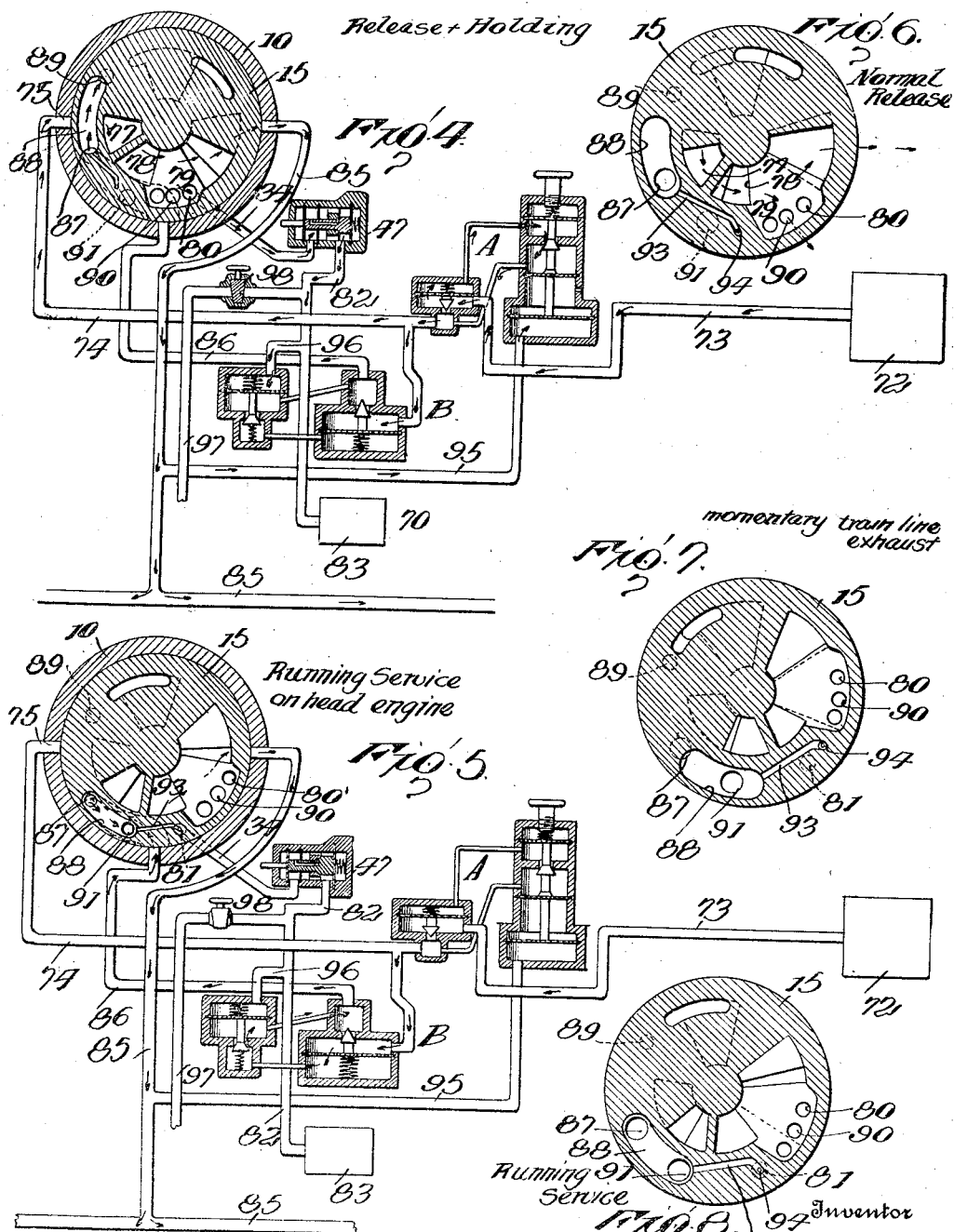

WILLIS C. WEBSTER, OF DUBOIS, PENNSYLVANIA, ASSIGNOR TO BUFFALO AIR-BRAKE COMPANY, OF BUFFALO, NEW YORK, A CORPORATION OF ARIZONA.

VALVE FOR TRAPPING EQUALIZING-RESERVOIR AIR INDEPENDENT OF BRAKE-VALVES.

1,244,805. Specification of Letters Patent. Patented Oct. 30, 1917.

Application filed May 28, 1915. Serial No. 31,028.

*To all whom it may concern:*

Be it known that I, WILLIS C. WEBSTER, a citizen of the United States, residing at Dubois, in the county of Clearfield and State of Pennsylvania, have invented certain new and useful Improvements in Valves for Trapping Equalizing-Reservoir Air Independent of Brake-Valves, of which the following is a specification.

My present invention relates to new and useful improvements in or attachments for engineers' brake valves and mechanisms coöperating therewith in air brake systems and consists more particularly in the provision of a valve for trapping equalizing reservoir air independent of the brake valve, but operating in conjunction therewith.

With present day air brake systems, the equalizing reservoir, in running service position of the brake valve, is in direct communication with what is commonly known as chamber D of the brake valve and the train line pressure is maintained at the same pressure as that in the equalizing reservoir. In a copending application, filed by me May 28, 1914, Serial No. 841,657, I have set forth in detail, the construction of a brake valve and kindred mechanisms in which the equalizing reservoir, during running service position of the brake valve, is not only in communication with chamber D of the brake valve, but also with a controlling chamber in a feed valve, which valve governs the flow of air to the train line. It will be clear that such being the case, an increase in pressure above or decrease in pressure below the reduced pressure in the equalizing reservoir, during running service position of the valve, would result in the feeding of air under too great or too little pressure to the train line and that, as a result, the brakes might be released, or in the latter instance, the recharging of the train line to normal pressure would be unduly retarded upon movement of the brake valve to release position.

The primary object of my invention consists in the provision of a separate and independent valve which, in running service position of the brake valve, absolutely shuts off communication between the equalizing reservoir and chamber D of the brake valve.

In other words, one of the primary objects of my invention consists in the provision of means for preventing an increase of pressure in the equalizing reservoir, when the brake valve is in running service position, due to the possibility of leakage of main reservoir pressure from above the rotary valve to chamber D and to the equalizing reservoir, such leaks commonly occurring, due to poorly fitting rotary valves or leaky gaskets. By this means, I prevent any possibility of feeding the train line at too high a pressure, which might cause release of some, if not all, of the brakes of the train.

Furthermore, by the provision of this valve, I accomplish the additional object of preventing any leakage of air from the equalizing reservoir to chamber D of the brake valve and so to the train line through leaky gaskets in the brake valve. As a result, the pressure in the equalizing reservoir cannot diminish, through leakage of the brake valve, after any predetermined reduction has been made, and the train line is fed at the proper pressure and not at a lower pressure, which would be the result if the pressure in the equalizing reservoir was too low. It will of course be clear that if the pressure in the train line is not maintained as high as it should be, the brake pressure will be unduly increased, necessitating the making of a release at an undesired time which, as will be appreciated, is a very serious defect.

A still further object of my invention consists in so constructing and applying my auxiliary valve for trapping equalizing reservoir pressure, that it will be automatically opened and closed by the movement of the handle of the brake valve in order that it may properly coöperate therewith.

In this connection, a still further object of my invention consists in providing a balanced valve for cutting off communication between the brake valve and equalizing reservoir in order not to unduly increase the force required to operate it and consequently to operate the brake valve and also in order that the valve will not be affected by differences in pressure in the chamber D and in the equalizing reservoir.

With present day air brake systems, there is sometimes a leakage of air from chamber D of the brake valve to the train line, due to leaky gaskets, with the result that chamber D and, consequently, the equalizing reservoir, is partially vented. Inasmuch as the pressure in chamber D controls the venting of the train line, it will be clear that if this leakage is sufficient, an undesired venting of the train line and further application of the brakes will be attained. As chamber D is relatively of slight volume, in comparison with the equalizing reservoir, it will be clear that if communication between the two is cut off, the pressure in chamber D may be increased above that of the equalizing reservoir without in any way affecting the action of the air brake system as its relatively small volume will immediately equalize with the equalizing reservoir pressure upon movement of the brake valve to either service or release positions.

A still further object of my invention, which object is rendered possible by my brake valve attachment, consists in providing means for feeding a slight quantity of air to chamber D of the brake valve when the latter is in running service position to prevent any possibility of undesired venting of the train line, due to leakage from chamber D.

As will be appreciated, however, this feeding of air to chamber D, immediately after movement of the brake valve from service to running service position, would tend to hasten the closing of the valve controlling the venting of the train line and would, therefore, result in venting less pressure from the train line than was desired and in securing a lower braking pressure than intended.

For this reason, a still further object of my invention consists in providing the brake valve with a new position which, for the sake of convenience, I term the momentary train line exhaust position, this position being intermediate the service and running service positions of the brake valve. In this new momentary train line exhaust position of the brake valve, there is no feeding of air to chamber D and the brake valve is customarily turned to this position and kept there until the valve controlling the venting of the train line has either closed or nearly closed, this being readily determined by the engineer, due to the difference in sound of the escaping air from the train line.

A still further object of my invention is to so construct the handle of the brake valve that it may be employed to control the valve for trapping equalizing reservoir air to open and close this valve at the proper time, and in providing such handle with a manually operable catch which may be locked in either retracted or extended position and which, in extended position, will prevent movement of the brake valve handle to lap, normal release or release and holding positions, while permitting it to move to running service, momentary train line exhaust, service and quick service positions.

By this means, I accomplish a still further object, namely, the provision of a brake valve particularly adapted for use in double heading as the brake valve upon a following engine may be locked in such a manner that it will normally be in running service position, thereby giving the engineer of the front engine entire control of the installation of the second engine and still permit the engineer of the second engine to apply the brakes, if necessary.

With these and other objects in view, my invention will be more fully described, illustrated in the accompanying drawings, and then specially pointed out in the claims which are attached to and form a part of this application.

In the drawings:

Figure 1 is a central, vertical sectional view taken through my improved brake valve and valve for trapping equalizing reservoir pressure, the brake valve being shown in running service position as it would be employed in connection with a single engine or in connection with the head engine of a number of engines;

Fig. 2 is a fragmentary top plan view of the mechanism shown in Fig. 1, the position of the brake valve being the same, Fig. 3 is a view corresponding to Fig. 2, but illustrating the valve for trapping the equalizing reservoir pressure, in section, and the catch of the brake valve handle extended as it would be upon a second or third engine in a train when double heading;

Fig. 4 is a diagrammatic view of the brake valve and various allied mechanism, such as the feed valves, illustrating their operation in release and holding position of the brake valve;

Fig. 5 is a similar view, showing the position of the various mechanisms in running service position of the brake valve;

Fig. 6 is a sectional, diagrammatic view of the brake valve at normal release position;

Fig. 7 is a similar view, showing the valve in the new momentary train line exhaust position;

Fig. 8 is a like view, showing the running service position of the valve and illustrating the feed of air to chamber D during such position of the valve.

Corresponding and like parts are referred to in the following description and indicated in all the views of the drawings by the same reference characters.

In order to insure a clear, accurate and complete understanding of my valve for trapping equalizing reservoir pressure, independent of the ordinary brake valve, I have illustrated it in connection with a brake valve of the type more fully disclosed and described in a copending application filed by me May 28, 1914, Serial No. 841,657, and with certain feed valves also fully described and illustrated in the above referred to application. However, in the present case, the brake valve has been somewhat changed, as will be later specifically pointed out, to permit the maintaining of pressure in the chamber D during running service position of the brake valve.

More specifically, my brake valve includes a casing, indicated as a whole by the numeral 10 comprising the usual lower portion 11, intermediate portion 12 and upper portion 13, the intermediate portion providing a seat 14 for the rotary valve 15, which valve has a stem 16 carrying a handle 17 by means of which it may be manually operated. The space below the rotary valve seat 14 is divided by a diaphragm 18 circumferentially secured against a stop shoulder 19 by a clamping ring 20 held in place by a spider or cage 21. This diaphragm carries a plunger valve 22 which is also guided in its movement by the cage and which controls venting of train line air from the lower chamber 23 through the outlet passage 24 to the atmosphere, this valve being normally held in closed position by a spring 25 and the air pressure in the chamber above the diaphragm, which chamber is commonly known as the chamber D and is so indicated in the drawings. A passage 26 leads from chamber D through the lower portion 11 of the valve casing and in the form of my brake valve illustrated in the copending application above referred to, a pipe establishes communication between this passage and the equalizing reservoir.

In the present instance, however, a separate and independent valve is interposed between the passage 26 and the pipe leading to the equalizing reservoir. As best shown in Figs. 1 to 3 of the drawings, this valve includes a casing 27 having an extended portion 28 intermediate its length. That face of the brake valve casing, diametrically opposite the brake handle 17, when the latter is in running service position, is cut-away to provide a plane surfaced face 29 about the passage 26 and a second plane surfaced face 30 adjacent the upper end of the brake valve casing and in vertical alinement with the face 29. The extended portion 28 of the equalizing reservoir pressure trapping valve 27 is flanged, as shown at 31 and 32 to bear against the faces 29 and 30 of the brake valve, respectively, and the valve casing 27 is secured to the brake valve casing by bolts 33 or other suitable means. This extended portion 28 of the casing 27 is provided with a duct or passage 34 which establishes communication between the passage 26 of the brake valve casing and the interior of the valve casing proper 27.

This valve casing 27 is closed at its ends by bonnets 35 and 36 and interiorly is divided into chambers 37, 38, 39 and 40 by diaphragms 41, 42 and 43. The chamber 38, between the diaphragms 41 and 42, is further divided by a septum or spider 44 having equalizing passages 45 and a valve seat 46 for a valve 47 which extends through and is secured to all of the diaphragms, being normally held in closed position by a light spring 48 located in the chamber 37. This valve 47 is provided with a stem 49 which projects through the bonnet 36 and extends in alinement with the brake valve handle 17 when the latter is in running service position. The passage 34 communicates with the chamber 39 between the diaphragms 42 and 43 and the valve casing 27 at a point between the diaphragms 41 and 42 is provided with a passage 50 adapted to communicate with a pipe from the equalizing reservoir, as will be later explained. The bonnets 35 and 36 are formed with atmospheric vents or passages 51 in order that the outer faces of the diaphragms 41 and 43 may be exposed to atmospheric pressure. Air or other fluid may pass from the chamber 38 to the chamber 39 or from the chamber 39 to the chamber 38 by means of radial passages 52 formed in the valve in such a manner as to be closed when the valve is seated and communicating with a longitudinal passage 53 also formed in the valve and in turn communicating with radial passages 54 formed in the valve or stem portion thereof and communicating with the chamber 39.

Inasmuch as the details of construction of the above described valve 47 are fully set forth in a copending application filed by me May 1st, 1915, and bearing the Serial No. 25273, any further extended explanation of such construction in this case is believed to be unnecessary. However, it should be noted that, with the exception of the spring 48, the valve is balanced and that any differences in pressures in the chambers 38 and 39 will have absolutely no tendency to either open or close the valve. For this reason, only such force is required to open the valve as is necessary to sufficiently compress the relatively light spring 48 and not such force as would be necessary to overcome pressure in the chamber 38.

In order to provide means for opening and permitting the closing of this valve 47, at the proper time, dependent upon the position of the rotary valve 15 of the brake valve, I provide the brake valve handle 17 with an extension 55 terminating just short of the free end of the valve stem 49 when the valve 47 is closed. This extension is provided at either side with arcuate cam portions 56 and 57 so arranged that when the brake valve is turned to service position, a cam face 58 will engage the valve stem 49 to open the valve 47 and further so arranged that when the brake valve is turned to either normal release or release and holding position, the cam face 59 will open the valve 47, the valve 47 at all other times remaining closed.

For a purpose which will be later explained, the free end of the extended portion 55 of the handle 17 is provided with a socket 60, the upper wall of which is provided with a longitudinal slot 61 and the lower wall with spaced openings 62 and 63. A latch or bolt 64 is reciprocally mounted in this socket and is so proportioned that in one position its free end is flush with the free end of the extension 55, while in another position it projects beyond the extension 55 to overlap the valve stem 49. As shown in Figs. 2 and 3, that end of the latch projecting beyond the extension 55 of the valve handle, is cut-away to provide a locking finger 65 which, when the valve handle is in running service position, engages one side of the valve stem 49 to prevent turning movement of the valve handle to either lap, normal release or release and holding positions. At the same time, the valve handle may be readily turned to quick service, to service position or to a new position, indicated at 66, the use of which will be later explained. As a means for manually operating the latch 64 and for locking it in either of its two positions, I provide a recess 67 in the lower face of the latch and a pin 68 is passed through the slot 61, through an opening formed in the latch and into the recess or socket 67, this pin being free for reciprocatory movement. At its end, this pin carries a head 69 which is capable of seating in either of the openings 62 and 63 and downward movement of the pin is limited by a knob 70 which also serves as a means for manually raising the pin against the pressure of a spring 71 seated in the recess or socket 67 and engaging against the head 69.

I will now explain in more detail such of the brake valve construction as is necessary to an understanding of the use and operation of the above described valve for trapping equalizing reservoir pressure, describing only such ports and passages of the brake valve as are in use in the positions of the brake valve when the equalizing reservoir trapping valve is in use, that is, in the release and holding, normal release, running service and new position of the brake valve which I term the momentary train line exhaust position.

In the release and holding position of the brake valve, the cam face 59 engages the valve stem 49 to open the equalizing reservoir air trapping valve 47. Under these conditions, air passes from the main reservoir 72 through a pipe 73 to a manually adjustable feed valve A and from this feed valve through a pipe 74 to a passage 75 communicating with a chamber 76 above the rotary valve 15. From this chamber the air passes through a passage or port 77 formed completely through the rotary valve 15 into the cavity 78 of the valve seat and so to the cavity 79 of the valve. From the cavity 79, a part of the air passes by the port 80 and passage 81 to chamber D of the brake valve, so by the passage 34 to the equalizing reservoir air trapping valve 47, through such valve and by way of the pipe 82 to the equalizing reservoir 83. Air also flows from the cavity 79 through the passage 84 to the chamber 23 and train line 85. In addition to the above feed of air, air flows from the automatic feed valve B through the pipe 86 to the passage 87 in the rotary valve seat and from this passage to the cavity 88 in the rotary valve and so to the passage 89 which communicates with chamber D and from this chamber to the passage 34, the valve 47 and the pipe 82 to the equalizing reservoir 83.

In the normal release position of the brake valve, the feed of air to the train line from the cavity 79 is the same as that above described and the feed of air from the cavity 79 to the equalizing reservoir is also the same, with the exception that, due to the turning of the rotary valve, the air now passes through the port 90 of the valve instead of the port 80. Furthermore, the passage 89 in normal release position of the brake valve is lapped and there is no feed of air from the automatic feed valve to the equalizing reservoir.

In running service position of the brake valve, air passes from the automatic feed valve through the pipe 86 to the port 87 of the valve seat and so to the cavity 88 of the valve which now covers both the port 87 and a port 91 which, by way of a passage 92, leads to the passage 84 and so to the chamber 23 and train line 85.

The above described ports and passages are illustrated and explained in far greater detail in my copending application previously referred to and as they are described in this case merely to permit the explanation of the operation of my improved valve for trapping equalizing reservoir pressure and an explanation of the new momentary train line exhaust position of my improved brake valve, any further explanation of them is believed to be unnecessary. As best shown in Fig. 1 of the drawings, the cavity 88 formed in the lower face of the rotary valve is formed with an extension or passage 93 which, at one end, is choked to provide a small leakage passage opening into a port 94 in the lower face of the rotary valve and adapted, in running service position of the valve, to register with the port 80 and, consequently, to communicate with the passage 81 leading to chamber D of the brake valve. It will, therefore, be clear that in running service position, a small quantity of air will be continuously fed from the automatic feed valve through the port 87, cavity 88, passage 93 and passage 81 to chamber D to maintain any pressure therein, in spite of possible leakage, and therefore to prevent an undesired opening of the valve 22 and consequent venting of the train line pressure. Reference to Fig. 7 of the drawings, which indicates the momentary train line exhaust position of my brake valve, shows that in this position, which is intermediate the service and running service positions of the brake valve, the ports 80 and 94 are blanked, for which reason there is no flow of air from the cavity 88 to the chamber D of the brake valve, although there may be slight communication through such cavity between the feed valve B and the train line.

Before explaining the operation of my present invention, attention is directed to Figs. 4 and 5 in which it will be seen that a pipe 95 establishes communication between the train line 85 and a controlling chamber in the manually adjustable feed valve A and that a pipe 96 establishes communication between the pipe 82, which establishes communication between the equalizing reservoir and chamber D of the brake valve, and a controlling chamber of the automatic feed valve B. These feed valves A and B are described in detail and their operation is fully explained in my copending application, several times referred to and for this reason I do not deem it necessary to give any detailed explanation either of their construction or operation in the present case. However, I wish to call attention to the fact that the feed valve A is so adjusted that in either release or release and holding positions of the brake valve, it is capable of feeding air from the main reservoir 72 through the pipe 74 to the brake valve and so to the train line and equalizing reservoir, in the usual manner, at the normal train line pressure and of automatically cutting off such flow of air as soon as pressure in the train line reaches the normal train line pressure. Furthermore, it is of such a type that in running service position of the brake valve, it is capable of feeding air from the main reservoir to the automatic feed valve B at whatever pressure the air in the main reservoir may be. Further, it should be noted that the automatic feed valve B, being controlled by the pressure in the equalizing reservoir, is, in running service position of the brake valve, capable of feeding air supplied to it by the manually adjustable feed valve A to the brake valve through the pipe 86 and so to the train line to maintain the pressure in the train line equal to the pressure in the equalizing reservoir.

A pipe 97, having a cut off valve 98, of any suitable type, leads from the pipe 82 at a point between the valve 47 and feed valve B to a double heading valve, not shown, as it forms the subject matter of a separate application, this double heading valve, when so connected, assuming that the valve 98 is open, permitting the engineer upon a front locomotive, upon which the valve 98 is closed, to have full control of the main reservoir and allied mechanism of the following engine in the train if the brake valve of the following engine is in running service position. This is merely mentioned in this case, in order to explain the advantage of providing the handle of the brake valve with a latch which will lock such handle of the brake valve against movement from running service position toward release positions and still permit its movement to quick service, service and momentary train line exhaust positions.

In describing the operation of my present invention I will assume that the brake valve has been turned to service position, thereby opening the valve 47 through engagement of the cam face 58 with the valve stem 49 to vent air from the equalizing reservoir 83 and chamber D to the atmosphere, in the usual manner until the pressure in the equalizing reservoir and chamber D has been reduced the desired amount, such as, for instance, five pounds. With ordinary brake valve constructions, when this reduction of the equalizing reservoir has been accomplished, the brake valve would be turned to lap position or, with my previously mentioned brake valve, to running service position to prevent further venting of air from the equalizing reservoir and to permit maintenance of the desired pressure in the train line during application of the brakes. With my improved brake valve construction, however, the brake valve, instead of being turned to running service position, is first turned to momentary train line exhaust position, indicated in Fig. 2 of the drawings and illustrated diagrammatically in Fig. 7. Under these circumstances, there is no feed either to the train line or equalizing reservoir or chamber D of the brake valve as the air pressure in the chamber 76 above the rotary valve is trapped. The manually adjustable feed valve A therefore merely feeds air from the main reservoir, at main reservoir pressure, to the automatic feed valve B which, being now controlled by the pressure in the equalizing reservoir, is only capable of feeding air to the brake valve and so to the train line at the pressure of the equalizing reservoir. For this reason, although the cavity 81 may possibly establish slight communication between the ports 87 and 91, no air will be fed to the train line as the train line pressure, until it has been exhausted to the same pressure as the equalizing reservoir, will in fact be greater than any air pressure fed by the automatic feed valve B. At this time there is no feeding of air to chamber D of the brake valve as the port 94 of the rotary valve is not in communication with the port 81 of the rotary valve seat. For this reason, air will be vented from the chamber 23 and, consequently, from the train line 85 until the pressure in the chamber 23 is lowered to equal the pressure in chamber D, that is, the reduced pressure in the equalizing reservoir 83, when the valve 22 will close.

At the time the valve 22 closes or just before it is closing, such time being readily determined by the engineer through the sound of air escaping through the passage 24, the brake valve is turned to running service position. It should be noted that movement of the brake valve to momentary train line exhaust position releases the valve 47 and permits the spring 48 to close it and that the valve 47 remains closed even when the brake valve is moved to running service position.

In running service position of the brake valve, the automatic feed valve B supplies air to the train line to maintain the train line pressure the same as the reduced pressure in the equalizing reservoir, this feeding of air, through the brake valve, being through the passage 87, the cavity 88 and the passage 92 to the chamber 23 and so to the train line. At this same time, a small quantity of air, due to the reduced size of the port 94, is fed from the cavity 88 through the passage 93, port 94 and passage 81 to chamber D of the brake valve. By this means, the pressure in chamber D of the brake valve is kept up to or possibly somewhat higher than the pressure in the equalizing reservoir, even though there is leak of air from the chamber D, due to leaky gaskets. By this means, I avoid any possibility of pressure in chamber D falling below the reduced train line pressure which would result in a renewed opening of the valve 22 and an undesired further reduction of train line pressure which would give increased brake application and which would also increase the length of time and quantity of air needed to recharge the train line to obtain release of the brakes. This feeding of air to chamber D, in running service position of the brake valve, because of the provision of the valve for trapping equalizing reservoir pressure independent of the brake valve, not only prevents building up of pressure in the equalizing reservoir, due to a leaky rotary valve and, consequently, in the train line which would release the brakes, but also prevents excessive building up of pressure in chamber D for as soon as such pressure exceeds the train line pressure it backs up into the cavity 88 and so to the train line to maintain pressure therein.

In double heading, the cut-off valve 98 of the equipment of the forward engine is kept closed, as is the case when the train is operated by a single engine, and the cut-off valve 98 of the following engine or engines is opened, the brake valve, upon the following engine or engines, being turned to running service position and locked against movement to lap, normal release or release and holding positions by manually moving the latch 64 to its extended position and locking it in such position by means of the pin 68, this latch in all other cases being held in retracted position. This setting of the brake valve and cut-off valve 98, together with the double heading valve, not shown, gives the engineer of the leading engine control of the main reservoir and feed valves of the following engine or engines and still permits the engineer of the following engine to manipulate his brake valve to apply the brakes if he deems it necessary, although he can not afterward release the brakes. The latch 64 is important as the engineer, when the latch is extended, cannot move the brake valve to lap, normal release or release and holding positions without first releasing the latch. He cannot, therefore, release the brakes upon the train without first performing a deliberate and unusual operation and accidental releasing of the brakes by an engineer upon a following engine is, therefore, prevented. Furthermore, it should be noted that the latch 64, when locked in extended position, locks the valve 47 in open position. Under these circumstances, it will be apparent that in double heading both the pressure chamber of the feed valve B, the equalizing reservoir and chamber D of the brake valve will be subject to whatever pressure is being fed to the train line, this pressure, as is pointed out in my application covering a double heading valve, being main reservoir pressure. It is therefore possible to feed this high pressure to the train line without any danger of the sudden building up of train line pressure opening the valve 22 as the pressure in chamber D will hold this valve firmly to its seat.

From the foregoing description, it will be apparent that I accomplish a number of highly desirable objects by the provision of a valve for tapping the pressure in the equalizing reservoir independently of the brake valve.

Although this valve for trapping the equalizing reservoir pressure need not necessarily be of the balanced valve type, such construction is much preferred as the valve is sure not to operate, due to possible changes in pressure between the chamber D of the brake valve and the equalizing reservoir and further due to the fact that it permits the controlling of the valve by the movement of the handle of the brake valve, without unduly increasing the force required to manipulate the brake valve.

Furthermore, the provision of this added valve, particularly if it is of the balanced type, permits the maintaining, or even building up, of pressure in chamber D of the brake valve when the latter is in running service position. This maintaining of pressure in chamber D is important as leakage from chamber D, even though this chamber did not communicate, in running service position of the brake valve, with the equalizing reservoir, might cause an undesired venting of the train line and consequent additional application of the brakes. At the same time, in order to render this maintaining of pressure in chamber D fully practical, I provide the new momentary train line exhaust position of the brake valve, during which position no air is fed to chamber D, thereby preventing any possibility of venting less pressure from the train line than desired at any given reduction of the equalizing reservoir, with resultant lower braking pressure.

Having thus described the invention, what is claimed as new is:

1. In fluid pressure brake systems, the combination with a brake valve having a pressure chamber controlling venting of the train line and an equalizing reservoir communicating with such chamber, of means other than the brake valve for automatically trapping the pressure in the equalizing reservoir in certain positions of the brake valve.

2. In fluid pressure brake systems, the combination with a brake valve having a pressure chamber controlling venting of the train line and an equalizing reservoir communicating with such chamber, of means other than the brake valve for automatically trapping the pressure in the equalizing reservoir in certain positions of the brake valve, said means also preventing passage of fluid from the pressure chamber to the equalizing reservoir in the same positions of the valve.

3. In fluid pressure brake systems, the combination with a brake valve having a pressure chamber controlling venting of the train line and an equalizing reservoir communicating with such chamber, of means other than the brake valve for trapping the pressure in the equalizing reservoir in certain positions of the brake valve, said means being automatically controlled by the brake valve.

4. In fluid pressure brake systems, the combination with an equalizing reservoir and a brake valve adapted, in a certain position, to vent fluid from the equalizing reservoir to the atmosphere, of means other than the brake valve adapted in certain positions of the brake valve to automatically trap the fluid in the equalizing reservoir.

5. In fluid pressure brake systems, the combination with an equalizing reservoir and a brake valve adapted, in a certain position, to vent fluid from the equalizing reservoir to the atmosphere, of a valve through which communication between the equalizing reservoir and brake valve is established adapted to automatically trap fluid in the equalizing reservoir in a certain position of the brake valve.

6. In fluid pressure brake systems, the combination with an equalizing reservoir and a brake valve adapted, in a certain position, to vent fluid from the equalizing reservoir to the atmosphere, of a valve through which communication between the equalizing reservoir and brake valve is established adapted to trap fluid in the equalizing reservoir in a certain position of the brake valve, and means operable by movement of the brake valve handle for automatically opening and closing such trapping valve.

7. In fluid pressure brake systems, the combination with an equalizing reservoir and a brake valve adapted, in a certain position, to vent fluid from the equalizing reservoir to the atmosphere, of a valve through which communication between the equalizing reservoir and brake valve is established adapted to trap fluid in the equalizing reservoir in a certain position of the brake valve, means operable by movement of the brake valve handle for automatically opening and closing such trapping valve, and a lock mechanism co-acting with such trapping valve and brake valve handle adapted in one position to prevent turning movement of the brake valve handle from running service position toward release position.

8. In fluid pressure brake systems, the combination with an equalizing reservoir and a brake valve adapted, in a certain position, to vent fluid from the equalizing reservoir to the atmosphere, of a valve through which communication between the equalizing reservoir and brake valve is established adapted to trap fluid in the equalizing reservoir in a certain position of the brake valve, means operable by movement of the brake valve handle for automatically opening and closing such trapping valve, and a lock mechanism co-acting with such trapping valve and brake valve handle adapted in one position to prevent turning movement of the brake valve handle from running service position toward release position, said locking means however not preventing movement of the brake valve handle toward service position.

9. In fluid pressure brake systems, the combination with an equalizing reservoir and a brake valve having a pressure chamber communicating with the equalizing reservoir and controlling venting of the train line and adapted, in one position of the valve, to be opened to the atmosphere and in another position of the brake valve to be shut off from the atmosphere, of means operable in the latter position of the brake valve for automatically shutting off communication between the chamber and reservoir.

10. In fluid pressure systems, the combination with an equalizing reservoir and a brake valve having a pressure chamber communicating with the equalizing reservoir and controlling venting of the train line and adapted, in one position of the valve, to be opened to the atmosphere and in another position of the brake valve to be shut off from the atmosphere, of means operable in the latter position of the brake valve for automatically shutting off communication between the chamber and reservoir and means for maintaining pressure in the chamber to compensate for possible leakage therefrom.

11. In fluid pressure brake systems, the combination with a main reservoir, a train line, a brake valve adapted to vent fluid from the train line in service position and to feed fluid from the reservoir to the train line in running service position, and a feed valve having a pressure chamber adapted to be vented by the brake valve to the same extent as the train line and controlling feed of fluid from the reservoir through the brake valve to maintain the reduced train line pressure, of means for preventing leakage of air from the brake valve to the pressure chamber to thereby prevent excessive feeding of fluid to the train line.

12. In fluid pressure brake systems, the combination with a main reservoir, a train line, a brake valve adapted to vent fluid from the train line in service position and to feed fluid from the reservoir to the train line in running service position, and a feed valve having a pressure chamber adapted to be vented by the brake valve to the same extent as the train line and controlling feed of fluid from the reservoir through the brake valve to maintain the reduced train line pressure, of a cut off valve preventing leakage of fluid from the brake valve to the pressure chamber and therefore preventing over-feeding of the train line through increase of pressure in such chamber.

13. In fluid pressure brake systems, the combination with a main reservoir, a train line, a brake valve adapted to vent fluid from the train line in service position and to feed fluid from the reservoir to the train line in running service position, and a feed valve having a pressure chamber adapted to be vented by the brake valve to the same extent as the train line and controlling feed of fluid from the reservoir through the brake valve to maintain the reduced train line pressure, of a cut off valve preventing leakage of fluid from the brake valve to the pressure chamber and therefore preventing over-feeding of the train line through increase of pressure in such chamber, said valve being opened by movement of the brake valve to service position and closing upon movement of the brake valve to running service position.

14. In fluid pressure brake system, the combination with a main reservoir, a train line, a brake valve adapted to vent fluid from the train line in service position and to feed fluid from the reservoir to the train line in running service position, an equalizing reservoir adapted to be vented by the brake valve to the same extent as the train line, means controlled by pressure in the equalizing reservoir for controlling the feeding of fluid from the main reservoir through the brake valve to maintain the reduced pressure therein, of means for preventing escape of fluid from the equalizing reservoir through the brake valve when the latter is in running service position.

15. In fluid pressure brake systems, the combination with a main reservoir, a train line, a brake valve adapted to vent fluid from the train line in service position and to feed fluid from the reservoir to the train line in running service position, an equalizing reservoir adapted to be vented by the brake valve to the same extent as the train line, means controlled by pressure in the equalizing reservoir for controlling the feeding of fluid from the main reservoir through the brake valve to maintain the reduced pressure therein, of means for preventing passage of air from the brake valve to the equalizing reservoir when the brake valve is in running service position.

16. In fluid pressure brake systems, the combination with a main reservoir, a train line, a brake valve adapted to vent fluid from the train line in service position and to feed fluid from the reservoir to the train line in running service position, an equalizing reservoir adapted to be vented by the brake valve to the same extent as the train line, means controlled by pressure in the equalizing reservoir for controlling the feeding of fluid from the main reservoir through the brake valve to maintain the reduced pressure therein, of a valve preventing passage of fluid from the equalizing reservoir to the brake valve or from the brake valve to the equalizing reservoir when the brake valve is in running service position although permitting passage of fluid from the brake valve to the equalizing reservoir when the brake valve is in release position and permitting passage of fluid from the equalizing reservoir to the atmosphere when the brake valve is in service position.

17. In fluid pressure brake systems, the combination with a main reservoir, a train line, and a brake valve adapted to feed air to the train line when in running service position to maintain the reduced pressure in the train line, of means other than the brake valve to insure such feeding of air to the train line, irrespective of brake valve leakage.

18. In a fluid pressure brake system, the combination with a brake valve having a pressure chamber controlling venting of the train line and adapted to be vented in proportion to the venting of the train line, of means for maintaining the pressure in the chamber after such venting to prevent additional venting of the train line.

19. In a fluid pressure brake system, the combination with a main reservoir, a train line, a brake valve adapted in service position to vent the train line to the atmosphere and in running service position to maintain the reduced pressure in the train line, an equalizing reservoir and a feed valve having a pressure chamber controlling feed of air through the feed valve, the equalizing reservoir and pressure chamber communicating with a pressure chamber in the brake valve controlling venting of the train line, such pressure chambers and equalizing reservoir being vented in proportion to the train line, of means for preventing passage of fluid from the pressure chamber of the brake valve to the equalizing reservoir and pressure chamber of the feed valve and from the pressure chamber of the feed valve and equalizing reservoir to the pressure chamber of the brake valve when the brake valve is in running service position, and means for maintaining the reduced pressure in the chamber of the brake valve while the brake valve is in such position.

20. In a fluid pressure brake system, the combination with a train line, a brake valve having a pressure chamber controlling venting of the train line in service position of the valve and a feed valve having a pressure chamber communicating with the pressure chamber of the brake valve, whereby the two chambers and train line will be uniformly vented, the pressure chamber of the feed valve controlling feed of air through the brake valve to the train line when the brake valve is in running service position, of means for increasing pressure in the chamber of the brake valve when the brake valve is in running service position to prevent additional venting of the train line.

21. In a fluid pressure brake system, the combination with a train line, a brake valve having a pressure chamber controlling venting of the train line in service position of the valve and a feed valve having a pressure chamber communicating with the pressure chamber of the brake valve, whereby the two chambers and train line will be uniformly vented, the pressure chamber of the feed valve controlling feed of air through the brake valve to the train line when the brake valve is in running service position, of means for increasing pressure in the chamber of the brake valve when the brake valve is in running service position to prevent additional venting of the train line, and means for preventing escape of air from the chamber of the brake valve to the chamber of the feed valve when the brake valve is in running service position.

22. In a fluid pressure brake system, the combination with a brake valve having a pressure chamber controlling venting of the train line and an equalizing reservoir controlling feeding of fluid to the train line, both the pressure chamber and equalizing reservoir being vented in proportion to the venting of the train line, of means including the brake valve operating in one position of the brake valve to prevent passage of fluid between the pressure chamber and equalizing reservoir and passage of fluid to the pressure chamber and operable in another position of the brake valve to still prevent passage of fluid between the pressure chamber and equalizing reservoir and supply fluid to the pressure chamber.

23. In fluid pressure brake systems, the combination with an equalizing reservoir and a brake valve adapted, in a certain position, to vent fluid from the equalizing reservoir to the atmosphere, of a valve through which communication between the equalizing reservoir and brake valve is established adapted to trap fluid in the equalizing reservoir in a certain position of the brake valve, means operable by movement of the brake valve handle for automatically opening and closing such trapping valve, and a lock mechanism co-acting with such trapping valve and brake valve handle adapted in one position to prevent turning movement of the brake valve handle from running service position toward release position, said lock mechanism holding the trapping valve in open position.

24. In fluid pressure brake systems, the combination with an equalizing reservoir and a brake valve, of a valve through which communication between the equalizing reservoir and brake valve is established adapted to trap fluid in the equalizing reservoir in a certain position of the brake valve, and means manually operable, whereby this valve can be held in open position with the brake valve in running service position.

In testimony whereof I affix my signature.

WILLIS C. WEBSTER. [L. S.]